United States Patent
Kuroda et al.

[11] Patent Number: 5,812,363
[45] Date of Patent: Sep. 22, 1998

[54] MULTILAYER CAPACITOR INCLUDING A DIELECTRIC BREAKDOWN PREVENTION LAYER

[75] Inventors: Yoichi Kuroda; Yukio Honda, both of Fukui, Japan; Kazumi Osuga, Taichun, Taiwan

[73] Assignee: Murata Manufacturing Co., Ltd., Japan

[21] Appl. No.: 853,319

[22] Filed: May 8, 1997

[30] Foreign Application Priority Data

May 9, 1996 [JP] Japan .................................. 8-114832

[51] Int. Cl.⁶ .................................................. H01G 4/228
[52] U.S. Cl. ................... 361/306.3; D361/308.1; D361/312; D361/321.2
[58] Field of Search .................. 361/301.4, 303, 361/306.1, 308.1, 309, 310, 311, 312, 313, 321.2, 321.3, 321.4, 321.5; 29/25.42; 257/295, 296, 303, 310

[56] References Cited

U.S. PATENT DOCUMENTS

| | | | |
|---|---|---|---|
| 4,652,967 | 3/1987 | Sakabe et al. | 361/309 |
| 5,034,851 | 7/1991 | Monsorno et al. | 361/321.2 |
| 5,040,092 | 8/1991 | Katho et al. | 361/321.2 |
| 5,172,299 | 12/1992 | Yamada et al. | 361/321.2 |
| 5,319,517 | 6/1994 | Nomura et al. | 361/321.4 |
| 5,687,055 | 11/1997 | Miki | 361/305 |

FOREIGN PATENT DOCUMENTS

| | | |
|---|---|---|
| 2555355 | 5/1985 | France . |
| 312815 | 12/1989 | Japan . |
| 201633 | 8/1995 | Japan . |

OTHER PUBLICATIONS

European Search Report dated Nov. 19, 1997.

*Primary Examiner*—Kristine L. Kincaid
*Assistant Examiner*—Anthony Dinkins
*Attorney, Agent, or Firm*—Ostrolenk, Faber, Gerb & Soffen, LLP

[57] ABSTRACT

A multilayer capacitor capable of having reducing electrical field intensity at external electrode edges while preventing occurrence of surface dielectric breakdown. This multilayer capacitor has a capacitor main body which includes a capacitance formation section having alternately laminated pluralities of internal electrodes and dielectric layers, and outer dielectric layer sections laminated on the upper and lower surfaces of the capacitance formation section. The capacitor also has external electrodes formed on respective opposite external side surfaces of the capacitor main body and each connected to certain ones of the internal electrodes. The outer layer sections each have respective dielectric breakdown prevention layers therein, each of which exhibits a carefully designed relative dielectric constant $\epsilon$ which is less than that of the dielectric layers in the capacitance formation section, and not more than 300, and has a thickness d [$\mu$m] satisfying the relation: $d > (0.2 \times \epsilon) + 20$.

26 Claims, 2 Drawing Sheets

MULTILAYER CAPACITOR INCLUDING A DIELECTRIC BREAKDOWN PREVENTION LAYER

BACKGROUND OF THE INVENTION

1. Field of the Invention

The present invention relates generally to electronic components, and more particularly to capacitive elements with a multiple layer lamination structure. The invention also relates to improvements in such multilayer capacitors for preventing or at least greatly suppressing the occurrence of surface dielectric breakdown therein.

2. Description of the Prior Art

Conventionally, multilayer capacitive elements include multilayer ceramic capacitors with which it may be possible to provide increased static capacitance with reduced or minimized size. This makes such capacitors well adaptable for use with electrical circuitry relatively low in withstand or rated voltage characteristics. Unfortunately, such multilayer ceramic capacitors remain unsuitable for use as so-called "middle- or high-voltage" capacitors with rated voltages of several hundreds volts or greater. When designing these middle- or high-voltage capacitors, it might be possible to increase the rated withstand voltage of dielectric layers laid between internal capacitor electrodes by increasing the thickness of the dielectric layers accordingly. However, such an increase does not come without an accompanying trade-off. As the dielectric layer thickness increases, the resultant capacitance decreases. Even where such capacitance reduction might be compensated for by use of an electronic circuitry design scheme, the prior known capacitors encounter a further, more serious problem: It remains difficult to prevent aerial surface dielectric breakdown from occurring between an external electrode and one internal electrode at the uppermost layer, to which is applied a voltage of the reverse polarity relative to that of the external electrode.

One prior known approach for inhibiting such aerial or "in-the-air" surface dielectric breakdown is disclosed, for example, in Published Unexamined Japanese Patent Application (PUJPA) No. 57-17615. This prior art will be described in connection with FIG. 5 hereafter. As shown in FIG. 5, a multilayer capacitor structure 1 has a capacitor main body 2 and a pair of first and second external electrodes 3 and 4 formed at opposite locations on the outer surfaces of the capacitor main body 2. The main body 2 consists of an alternating lamination of a plurality of internal electrodes 5, 6 and plural dielectric layers 7. These internal electrodes 5, 6 may be classified into two groups: one group is the first internal electrodes 5, and the other is the second internal electrodes 6. A respective one of the first internal electrodes 5 makes a pair with a corresponding, adjacent one of the second internal electrodes 6 with one dielectric layer 7 laid between them thus defining a certain static capacitance therebetween. The first internal electrodes 5 are electrically connected to the first external electrode 3 whereas the second internal electrodes 6 are electrically coupled to the second external electrode 4. The above multilayer capacitor structure per se has been widely employed in currently available standard capacitors.

In the multilayer capacitor 1, in order to prevent in-the-air surface dielectric breakdown, the internal electrodes 5, 6 are designed in such a manner that their outermost ones 5a, 6a placed at the uppermost and lowermost positions of the multilayer structure are shortened in longitudinal length to ensure that the lengths of these electrodes 5a, 6a are less than half the length of the remaining ones of the internal electrodes 5, 6. This may serve to increase the net distance between one external electrode 3 and the opposing end of its associated uppermost internal electrode 6a which will be opposite in polarity of potential relative to the external electrode 3. The same is true for the other external electrode 4 and its associated lowermost internal electrode 5a. This in turn results in decreasing the intensity of an electric field created therebetween to thereby eliminate occurrence of in-the-air surface dielectric breakdown.

Unfortunately, the prior art capacitor is still faced with several serious problems as will be set forth below.

One problem of the multilayer prior art capacitor 1 as taught by PUJPA No. 57-17615 is that shortening the outermost internal electrodes 5a, 6a might decrease the resulting static capacitance to as low as half the static capacitance available from standard multilayer capacitors. This is because of the fact that the area of the outermost internal electrodes 5a, 6a is decreased in comparison with the remaining internal electrodes 5, 6, resulting from the shortening of their length.

Another problem of the prior art capacitor 1 is that the complexity of its manufacturing process is increased. This is due to the fact that during the lamination of the ceramic sheets for fabrication of the intended multilayer structure, an increased number of differently patterned sheets must be separately prepared and treated.

Still another problem is that the resulting surface dielectric breakdown characteristics can vary or deviate among the capacitors fabricated. This occurs due to the fact that the in-the-air surface dielectric breakdown characteristics remain inherently variable depending upon the actual distance between each outermost internal electrode 5a, 6a and its associated external electrode 4, 3. Such distance tends to vary during the step of laminating multiple electrode sheets with an insulative film being sandwiched between adjacent ones thereof.

A further problem is that even with the outermost internal electrodes 5a, 6a shortened in length, the surface dielectric breakdown level can still decrease in some cases. More specifically, even where the outermost (say, the "top" and "bottom") internal electrodes 6a, 5a are shortened in longitudinal length, thereby increasing the net distance between each of them and the electrically coupled external electrode 3 or 4, when the multilayer capacitor 1 is mounted on a printed wiring board (PWB), it will possibly take place that one of such electrodes 5a, 6a accidentally comes closer to an associated conductive land pad on the PWB. This unwanted positional contiguity, or in the worst case, partial contact with a conductor on a PWB can adversely reduce the resultant surface dielectric breakdown voltage level.

SUMMARY OF THE INVENTION

An advantage of the present invention is that it is able to provide a multilayer capacitive device capable of avoiding the problems faced with the prior art.

Another advantage of the invention is that it can provide an improved multilayer capacitor which has reduced electrical field intensity at its external electrode edges while suppressing or eliminating the occurrence of surface dielectric breakdown.

To attain the foregoing advantages the present invention provides a multilayer capacitor structure having a capacitor main body including a capacitance formation section with alternately laminated pluralities of internal electrodes and dielectric layers, and outer layers including dielectric or insulative material which are stacked respectively on upper and lower surfaces of the capacitance formation section.

The capacitor structure also includes first and second external electrodes on the external surface of the capacitor main body. The plurality of internal electrodes are divided into pairs of first internal electrodes and second internal electrodes and are arranged to form a respective static capacitance between the adjacent electrodes of each pair. The first internal electrodes are electrically connected to the first external electrodes whereas the second internal electrodes are electrically connected to the second external electrodes.

Each of the outer layers has a dielectric breakdown prevention layer. This layer has a specifically selected relative dielectric constant $\epsilon$ that is lower in value than the dielectric layers of the capacitance formation section and also not greater than 300. The dielectric breakdown prevention layer also has a thickness d [$\mu$m] which satisfies a specific relation as given by: $d > (0.2 \times \epsilon) + 20$.

It should be noted that each aforesaid dielectric breakdown prevention layer may be arranged so as to constitute the whole of a respective outer layer section; or alternatively, the dielectric breakdown prevention layer may be arranged so as to constitute only part of the respective outer layer section.

Other features and advantages of the present invention will become apparent from the following description of the invention which refers to the accompanying drawings.

DETAILED DESCRIPTION OF EMBODIMENTS OF THE INVENTION

Figure 1:
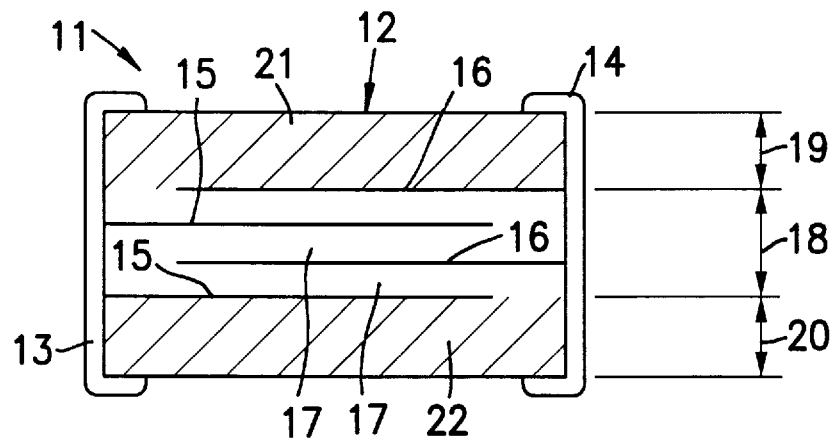
FIG. 1 is a diagram showing a cross-sectional view of a multilayer capacitor in accordance with one preferred embodiment of the present invention.

Referring to FIG. 1, a capacitor with a multiple-layer lamination structure in accordance with one preferred embodiment of the invention is generally designated by numeral 11. This multilayer capacitor 11 is constituted from a capacitor main body 12 and a pair of first and second external electrodes 13, 14 which are formed at the opposite position on the outer wall surfaces of capacitor main body 12. Capacitor main body 12 includes a capacitance formation section 18 which is structured from an alternate lamination of a plurality of internal electrodes 15, 16 and multiple dielectric layers 17 in such a manner that one dielectric layer 17 is sandwiched between each adjacent pair of the internal electrodes 15, 16. Capacitor main body 12 also includes an outermost insulative or dielectric layer section 19 on the top surface of capacitance formation section 18, and an outermost insulative or dielectric layer section 20 on the bottom surface thereof.

Each of the first internal electrodes 15 and an adjacent one of the second internal electrodes 16 makes a pair with one dielectric layer 17 being laid therebetween for formation of a static capacitance. First internal electrodes 15 are electrically connected to the first external electrode 13 whereas second internal electrodes 16 are electrically connected to the second external electrode 14.

As shown by use of hatching in FIG. 1, the "top" outer dielectric layer section 19 has a dielectric breakdown prevention layer 21 formed above the top internal electrode; similarly, the "bottom" outer layer section 20 has a dielectric breakdown prevention layer 22 below the bottom internal electrode. These dielectric breakdown prevention layers 21, 22 are made of a suitable insulative or dielectric material which has a specific relative dielectric constant $\epsilon$ that is less than that of the dielectric layers 17 in the capacitance formation section 18 and simultaneously less than or equal to 300. The thickness d [$\mu$m] of a respective one of the dielectric breakdown prevention layers 21, 22 is carefully selected in value so as to satisfy a specific formula: $d > (0.2 \times \epsilon) + 20$. The reason for applying these dielectric breakdown prevention criteria regarding the material and dimensions will become apparent in conjunction with further embodiments as will be set forth later in the description.

By providing the dielectric breakdown prevention layers 21, 22 with specifically designed relative dielectric constant and thickness in the opposite outer layer sections 19, 20 as described above, it becomes possible to force the intensity of the electric field at the edge portions of the external electrodes 13, 14 to remain lowered. This may in turn enable successful prevention of occurrence of in-the-air surface dielectric breakdown therein.

This invention may be typically applicable not only to ceramic capacitor devices but also to other types of multilayer capacitors employing dielectric materials other than ceramics.

Figure 2:
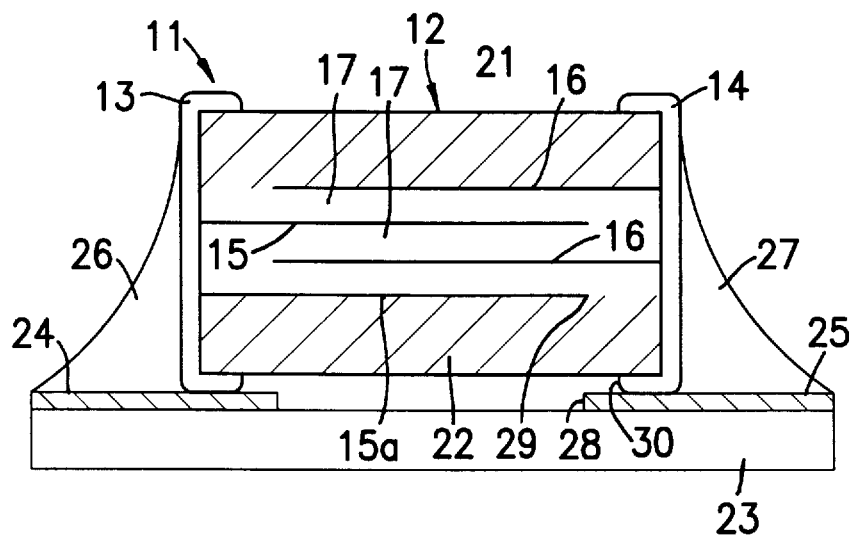
FIG. 2 is a pictorial representation of the multilayer capacitor of FIG. 1 as mounted on a PWB.

One exemplary assembly state of the multilayer capacitor 11 of FIG. 1 is shown in FIG. 2, wherein capacitor 11 is mounted on a printed circuit board (PCB) or printed wiring board (PWB) 23.

As shown in FIG. 2, the multilayer capacitor 11 is rigidly placed on the PWB 23 and electrically coupled at external electrodes 13, 14 to associated conductive connection pads or "lands" 24, 25 on PWB 23 via solder 26, 27 applied thereon.

Typically, after mounting on the PWB 23, the multilayer capacitor 11 might be expected to have a lower surface dielectric breakdown voltage than before. This can be said because in the mounted state, the distance, for example, between a terminating edge 28 of one conductive land 25 and a distal end 29 of the lowermost internal electrode 15a, this internal electrode 15a being potentially opposite in polarity to land 25, is less than the distance between the corresponding terminating edge 30 of the external electrode 14 and the distal end 29 of such internal electrode 15a, possibly causing the electric field to become stronger at the terminating edge 28 of conductive land 25.

To respond to this potential problem, in the multilayer capacitor 11 shown in FIG. 1, the outer layer sections 19, 20 of capacitor main body 12 are specifically provided with the dielectric breakdown prevention layers 21, 22, respectively. With such an arrangement, when mounted on the PWB 23 as shown in FIG. 2, since one dielectric breakdown prevention layer 22 placed on the side of PWB 23 has a reduced relative dielectric constant as mentioned previously, this may act to lower the intensity of an electric field created between the terminating edge 28 of the conductive land 25 and the distal end 29 of the lowermost internal electrode 15a thus enabling suppression or elimination of the occurrence of surface dielectric breakdown.

Figure 3:
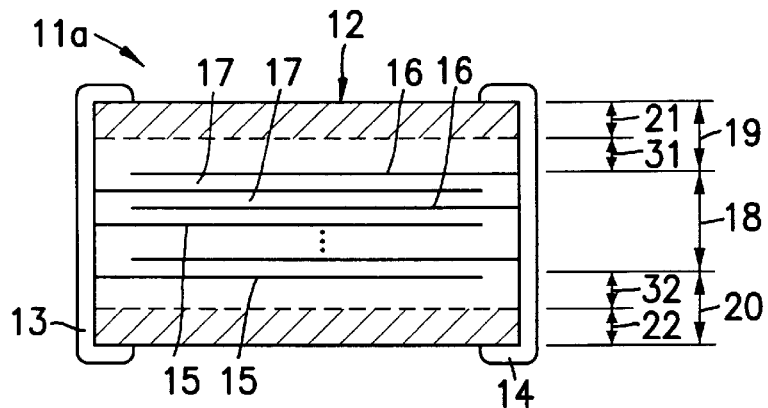
FIGS. 3 and 4 illustrate, in cross-section, respective multilayer capacitors in accordance with further embodiments of the invention.

A multilayer capacitor 11a in accordance with another embodiment of the invention is shown in FIG. 3, wherein like parts or components are designated by like reference numerals for purposes of convenience of explanation only.

This multilayer capacitor 11a of FIG. 3 is similar to the multilayer capacitor 11 shown in FIG. 1 with the dielectric breakdown prevention layers 21, 22 being modified to constitute only part of the respective outer layer sections 19, 20 of the capacitor main body 12 rather than the entire outer layer sections 19, 20. More specifically, the top outer layer section 19 may have two parts: an upper half section constituted by the dielectric breakdown prevention layer 21, and a lower half section comprised of an inert or null layer 31, i.e., which does not contribute to forming the capacitance. Likewise, the bottom outer layer section 20 may have an upper half section formed of a null layer 32, and a lower half section formed of a dielectric breakdown prevention layer 22 as shown. These null layers 31, 32 may be made of the same material as the dielectric layers 17 in the capacitance formation section 18.

With such a configuration, employing partial dielectric breakdown prevention layers 21, 22 in outer layer sections 19, 20, similar advantageous surface dielectric breakdown prevention is attainable by meeting the above-described thickness setting criterion.

Note in FIG. 3 that while the internal electrodes 15, 16 and their associated dielectric layers 17 in the capacitance formation section 18 are greater in number than those of the embodiment of FIG. 1, this will not constitute any substantive difference between the respective embodiments.

Note also that in FIG. 3, while the dielectric breakdown prevention layers 21, 22 are arranged at the opposite peripheral surfaces of outer layer sections 19, 20, these may alternatively be formed internally (within the null layers and next to the capacitance formation section), or still alternatively, each may be "embedded" at an intermediate location within a corresponding one of the outer layer sections 19, 20 in such a way as to be sandwiched between upper and lower null layers when appropriate.

In this regard, when partial dielectric breakdown prevention layers 21, 22 are provided in outer layer sections 19, 20, either at the opposite exposed surfaces thereof as shown in FIG. 3 or at internal or intermediate locations within the layer sections 19, 20, the null layer 31 or 32 is preferably to be laid between each dielectric breakdown prevention layer 21, 22 and its associated surface of the capacitance formation section 18. This may offer a significant advantage as will be described below.

Where the multilayer capacitor 11a is a multilayer ceramic capacitor, a baking process is additionally required for fabrication of the capacitor main body 12. Furthermore, the dielectric material constituting the dielectric breakdown prevention layers 21, 22 is different in relative dielectric constant and in temperature characteristic from that of the dielectric layers 17 of the capacitance formation section 18. In view of these facts, such different dielectric materials may attempt to diffuse into each other during the manufacture of multilayer ceramic capacitor 11a. Thus, as a result of the baking process, the intended characteristics are no longer achieved in the individual dielectric breakdown prevention layers 21, 22 and dielectric layers 17. Fortunately, with null layers 31, 32 sandwiched between the dielectric breakdown prevention layers 21, 22 and the capacitance formation section 18, it becomes possible for the mutually diffusible regions to be left at or "confined" within null layers 31, 32, minimizing undesired diffusion, thereby to facilitate obtaining any desired characteristics in each of the dielectric breakdown prevention layers 21, 22 and dielectric layers 17.

Figure 4:
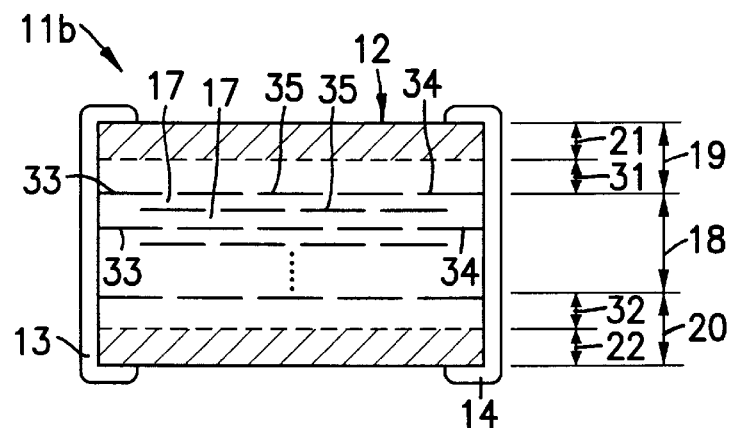
Figure 5:
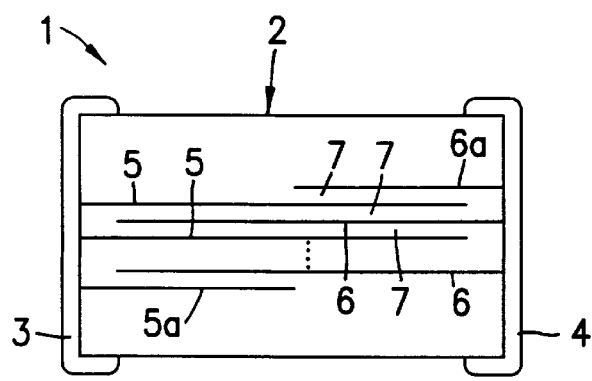
FIG. 5 depicts in cross-section one prior art multilayer capacitor.

A multilayer capacitor 11b in accordance with a further embodiment of the invention is shown in FIG. 4, wherein like numerals are used to identify like parts for clarity purposes.

The multilayer capacitor 11b of FIG. 4 may be similar to that 11a shown in FIG. 3 with the internal electrodes 15, 16 each being replaced with an ensemble of first lead internal electrodes 33 electrically connected to the first external electrode 13, second lead internal electrodes 34 electrically connected to the second external electrode 14, and a plurality of insulated or electrically floating internal electrode segments 35 between each pair of first and second lead electrodes 33, 34 as shown in FIG. 4. The term "lead" as used herein may refer to any conductor for use in electrically coupling the internal electrode segments to one of the first and second external electrodes 13, 14. The floating internal electrodes 35 are arranged between the first and second lead internal electrodes 33, 34 for creation of a series combination of multiple capacitances inside the capacitance formation section 18.

In this embodiment, an array of seven floating internal electrode segments 35 are disposed between one pair of opposing first and second internal lead electrodes 33, 34 thereby forming a train of eight series-coupled capacitance components associated therewith. However, as can be readily seen by those skilled in the art, the invention should not be exclusively limited to this number per se. The number of internal series-coupled capacitance components may freely be modified as required, such as two, three, four, five, six, and so forth.

One significant advantage of the multilayer capacitor 11a of FIG. 4 is that it offers the "capacitance subdivision" effect which in turn serves to further enhance the level of high-voltage withstanding characteristics thereof. Simultaneously, this makes it possible to further increase the surface dielectric breakdown voltage because of the fact that dielectric breakdown prevention layers 21, 22 are provided in the outer layer sections 19, 20 respectively in a manner similar to that of the previous embodiment shown in FIG. 3.

The rest of this description will be devoted to explanation of some practical examples employing the principles of the invention. First, consider an exemplary device having the structure of the FIG. 1 embodiment as manufactured in a way that will be set forth below.

A capacitance formation section 18 was prepared by sequentially laminating dielectric layers 17 of 100-$\mu$m thickness with relative dielectric constant of 2500 along with two internal electrodes 15 and two internal electrodes 16 to provide the multilayer structure shown in FIG. 1. Then, there were manufactured a variety of samples which vary among them in relative dielectric constant of dielectric breakdown prevention layers 21, 22 in such a manner as to exhibit relative dielectric constants of 100, 200 and 300 while at the same time having varying thicknesses of 20, 40, 60, 80, 100, 120 and 140 micrometers.

Resultant multilayer ceramic capacitor samples were subjected to the AC-BVD test for identification of the presence or absence of aerial discharge in order to analyze and evaluate the resulting surface dielectric breakdown level with respect to each sample. During this test procedure the surface dielectric breakdown was made certain by observing whether aerial discharge takes place upon application of a potentially raised AC voltage between the external electrodes 13, 14 at a rate of 200 volts per second while each sample is in the air.

Table 1 below clearly demonstrates the correlation of the relative dielectric constant and thickness of the dielectric breakdown prevention layers 21, 22 versus the rate of occurrence (occurrence number/total sample number) of surface dielectric breakdown.

TABLE 1

| Relative Dielectric Constant ε | Thickness d [μm] | | | | | | |
|---|---|---|---|---|---|---|---|
| | 20 | 40 | 60 | 80 | 100 | 120 | 140 |
| 100 | 8/10 | 5/10 | 0/10 | 1/10 | 0/10 | 0/10 | 0/10 |
| 200 | 9/10 | 7/10 | 4/10 | 0/10 | 0/10 | 0/10 | 0/10 |
| 300 | 10/10 | 8/10 | 9/10 | 5/10 | 1/10 | 0/10 | 0/10 |

As readily seen by those skilled in the art from the foregoing Table 1, the surface dielectric breakdown prevention may be successfully attained (no more than one breakdown out of ten samples) under specific conditions wherein the dielectric breakdown prevention layers 21, 22 are less than or equal to 300 in relative dielectric constant and simultaneously the thickness thereof satisfies:

$$d > (0.2 \times \epsilon) + 20,$$

where d is the thickness of layers 21, 22 as measured in micrometers (μm).

Next, some actual working samples of the multilayer ceramic capacitor 11b shown in FIG. 4 were also prepared in a way as will be explained below.

A capacitance formation section 18 was prepared by sequentially laminating dielectric layers 17 of 30-μm thickness with relative dielectric constant of 2500 along with internal lead electrodes 33, 34 and electrically floating internal electrode segments 35, wherein forty (40) dielectric layers with corresponding internal electrodes were laminated. The same dielectric material was employed for dielectric layers 17 and null layers 31, 32, both of which measured 50 μm in thickness. Thus, several samples were manufactured including (1) a capacitor structure having dielectric breakdown prevention layers 21, 22 of 300-μm thickness with relative dielectric constant of 2500, (2) a capacitor having dielectric breakdown prevention layers 21, 22 of 50-μm thickness with relative dielectric constant of 300, and (3) a capacitor having dielectric breakdown prevention layers 21, 22 of 100-μm thickness with relative dielectric constant of 300. These three samples will be identified by labels "SPL1" to "SPL3" hereinafter for clarity purposes.

As in the previous case, the resultant multilayer ceramic capacitor samples were subjected to the AC-BVD test for identification of presence or absence of aerial discharge in order to evaluate the resultant surface dielectric breakdown level with respect to each sample. Table 2 as will be presented below clearly demonstrates the relation of an average value (X), maximum value (MAX), minimum value (MIN) and deviation (σ) of the surface dielectric breakdown level (AC-BVD) with respect to twenty test samples prepared.

TABLE 2

| Sample No. | AC-BVD [KVrms] | | | |
|---|---|---|---|---|
| | X | MAX | MIN | σ |
| #1 | 4.3 | 5.4 | 2.6 | 0.80 |
| #2 | 4.1 | 5.0 | 3.0 | 0.53 |
| #3 | 4.6 | 5.2 | 4.0 | 0.27 |

It can be seen that in Table 2 above, the sample SPL1 may be equivalent to the prior art whereas SPL3 does meet the "relative dielectric constant/thickness" criteria as given by the formula presented supra, wherein the latter is more excellent than the former in its surface dielectric breakdown voltage level. This demonstrates the effectiveness of the present invention even for use with multilayer capacitors of the type which form series-connected capacitance components therein.

It should be noted that as can be seen upon comparing the samples SPL1 and SPL3, when the relative dielectric constant of the dielectric breakdown prevention layers 21, 22 is reduced in value from 2500 to 300, the resulting surface dielectric breakdown level remained substantially identical regardless of the fact that the thickness thereof was decreased from 300 to 50 μm. This may be considered to result from the presence of the series combination of capacitance components in the capacitance formation section 18 of FIG. 4, which successfully functions to compensate for such possible decrease in surface dielectric breakdown level.

It has been described that according to embodiments of the present invention, each of the outer layer sections of the capacitor main body is specifically configured with a respective dielectric breakdown prevention layer. This dielectric breakdown prevention layer has a relative dielectric constant ε which is less in value than that of any of the dielectric layers of the capacitance formation section and also is not more than 300, and its thickness d [μm] is specifically selected so as to satisfy the following formula: $d > (0.2 \times \epsilon) + 20$.

With such an arrangement, as appreciated by those skilled in the art in light of the foregoing description of certain embodiments, the external electrodes may have lower electric field intensity at their edge portions, which in turn advantageously serves to eliminate or at least greatly suppress in-the-air surface dielectric breakdown otherwise occurring due to application of a voltage thereto, while simultaneously preventing such surface dielectric breakdown from developing due to assembly onto a PWB. Consequently, employing the principles of the invention may permit achievement of improved multilayer capacitors adaptable for use with middle- or high-voltage withstanding circuitry.

It should be noted that in these embodiments of the invention, setting the value of relative dielectric constant of the dielectric breakdown prevention layers at 300 or less is based on the fact that if it otherwise increases beyond such value, then the resultant thickness required for the dielectric breakdown prevention layers increases, causing the total thickness of the multilayer capacitors to undesirably increase accordingly.

While the invention has been particularly shown and described with reference to certain preferred embodiments thereof, it will be understood by those skilled in the art that the foregoing and other changes in form and details may be made therein without departing from the spirit and scope of the invention.

What is claimed is:

1. A multilayer capacitive device having a capacitor main body including a capacitance formation section comprising alternately laminated pluralities of internal electrodes and dielectric layers, and outer layer sections including materials selected from the group consisting of insulative and dielectric materials stacked respectively on upper and lower surfaces of said capacitance formation section; and first and second external electrodes formed at different respective positions on an external surface of said capacitor main body, wherein said internal electrodes comprise pairs of first internal electrodes and second internal electrodes which are arranged to form a static capacitance between each adjacent pair thereof, wherein said first internal electrodes are electrically connected to the first external electrode and said second internal electrodes are electrically connected to the second external electrode, and wherein each said outer layer section comprises a dielectric breakdown prevention layer having a relative dielectric constant $\epsilon$ which is less than that of the dielectric layers of said capacitance formation section and also is less than or equal to 300, and said dielectric breakdown prevention layer has a thickness d [$\mu$m] satisfying the relation: $d>(0.2\times\epsilon)+20$.

2. A multilayer capacitive device as recited in claim 1, wherein in at least one of said outer layer sections, the corresponding said dielectric breakdown prevention layer comprises only part of said outer layer section.

3. A multilayer capacitive device as recited in claim 2, wherein said part of said outer layer section is an outer part of said outer layer section.

4. A multilayer capacitive device as recited in claim 3, wherein a corresponding inner part of said outer layer section is an inert layer which does not contribute to forming a capacitance of said capacitive device.

5. A multilayer capacitive device as recited in claim 2, wherein all of said outer layer sections, said dielectric breakdown prevention layer comprises only part of said outer layer section.

6. A multilayer capacitive device as recited in claim 5, wherein said part of each said outer layer section is an outer part of said outer layer section.

7. A multilayer capacitive device as recited in claim 6, wherein a corresponding inner part of each said outer layer section is an inert layer which does not contribute to forming a capacitance of said capacitive device.

8. A multilayer capacitive device as recited in claim 1, wherein said first internal electrodes are arranged to overlap said second internal electrodes in a thickness direction defined between said upper and lower surfaces.

9. A multilayer capacitive device as recited in claim 1, wherein said first internal electrodes are arranged to not overlap said second internal electrodes in a thickness direction defined between said upper and lower surfaces.

10. A multilayer capacitive device as recited in claim 9, further comprising a plurality of electrically floating internal electrode segments arranged for forming series capacitances between said first internal electrodes and said second internal electrodes..

11. A multilayer capacitive device as recited in claim 10, wherein said plurality of internal electrode segments are arranged at respective positions which are substantially aligned with said first and second internal electrodes in said thickness direction.

12. A multilayer capacitive device as recited in claim 11, wherein said plurality of internal electrode segments are arranged at respective positions which are intermediate between said first and second internal electrodes with respect to said thickness direction.

13. A multilayer capacitive device as recited in claim 10, wherein said plurality of internal electrode segments are arranged at respective positions which are intermediate between said first and second internal electrodes with respect to said thickness direction.

14. A multilayer capacitive device comprising:

a capacitor main body including a capacitance formation section comprising alternately laminated pluralities of internal electrodes and dielectric layers, and outer layer sections including materials selected from the group consisting of insulative and dielectric materials stacked respectively on upper and lower surfaces of said capacitance formation section; and first and second external electrodes formed at different respective positions on an external surface of said capacitor main body, wherein said internal electrodes comprise first internal electrodes and second internal electrodes, said first internal electrodes being electrically connected to the first external electrode and said second internal electrodes being electrically connected to the second external electrode, said first and second internal electrodes being arranged at respective positions so as to form a static capacitance therebetween, and wherein each said outer layer section comprises a dielectric breakdown prevention layer having a relative dielectric constant $\epsilon$ which is less than that of the dielectric layers of said capacitance formation section and also is less than or equal to 300, and said dielectric breakdown prevention layer has a thickness d [$\mu$m] satisfying the relation: $d>(0.2\times\epsilon)+20$.

15. A multilayer capacitive device as recited in claim 14, wherein in at least one of said outer layer sections, the corresponding said dielectric breakdown prevention layer comprises only part of said outer layer section.

16. A multilayer capacitive device as recited in claim 15, wherein said part of said outer layer section is an outer part of said outer layer section.

17. A multilayer capacitive device as recited in claim 16, wherein a corresponding inner part of said outer layer section is an inert layer which does not contribute to forming a capacitance of said capacitive device.

18. A multilayer capacitive device as recited in claim 15, wherein all of said outer layer sections, said dielectric breakdown prevention layer comprises only part of said outer layer section.

19. A multilayer capacitive device as recited in claim 18, wherein said part of each said outer layer section is an outer part of said outer layer section.

20. A multilayer capacitive device as recited in claim 19, wherein a corresponding inner part of each said outer layer section is an inert layer which does not contribute to forming a capacitance of said capacitive device.

21. A multilayer capacitive device as recited in claim 14, wherein said first internal electrodes are arranged to not overlap said second internal electrodes in a thickness direction defined between said upper and lower surfaces.

22. A multilayer capacitive device as recited in claim 21, further comprising a plurality of electrically floating internal electrode segments arranged for forming series capacitances between said first internal electrodes and said second internal electrodes.

23. A multilayer capacitive device as recited in claim 22, wherein said plurality of internal electrode segments are arranged at respective positions which are substantially aligned with said first and second internal electrodes in said thickness direction.

24. A multilayer capacitive device as recited in claim 23, wherein said plurality of internal electrode segments are arranged at respective positions which are intermediate between said first and second internal electrodes with respect to said thickness direction.

25. A multilayer capacitive device as recited in claim 22, wherein said plurality of internal electrode segments are arranged at respective positions which are intermediate between said first and second internal electrodes with respect to said thickness direction.

26. A multilayer capacitive device as recited in claim 14, wherein said first internal electrodes are arranged to overlap said second internal electrodes in a thickness direction defined between said upper and lower surfaces.

* * * * *